United States Patent Office 3,284,212
Patented Nov. 8, 1966

3,284,212
FOOD PRESERVATIVE COMPRISING ENZYMES AND ANTIOXIDANTS
Talmadge B. Tribble and Eugene L. Rondenet, Glenview, Ill., assignors to Flavor Corporation of America, Chicago, Ill., a corporation of Delaware
No Drawing. Filed Mar. 6, 1963, Ser. No. 263,134
10 Claims. (Cl. 99—9)

This invention relates to improved means for preserving food.

More particularly, this invention concerns improved ingredients to be added to raw foods for the purpose of preserving the same against deterioration, principally by controlling and regulating factors such as oxidation, microorganism activity and/or other chemical and biological changes.

One of the most important factors producing food deterioration is oxidation. For oxidation occurs when the oxygen present unites with other chemical elements or groups of elements in foods to form oxides which cause the breakdown of fatty or other carbohydrate food components resulting in the ultimate deterioration of protein matter. The reactions arising out of and accompanying oxidation are believed to cause various chemical and biological changes resulting in such undesired results as rancidification of fats, molding of carbohydrates and putrefaction of proteins. Basically, the undesirable effects of food oxidation appear to stem primarily from microorganism activity and chemical changes and/or reactions.

All organic foods also contain microscopic forms of parasitic plant and vegetable life called microorganisms which live on larger forms of life. Among the most common microorganisms in food, useful to man and animal, are bacteria, molds and yeasts. Not all such microorganisms, however, are necessarily harmful or undesirable. For example, lactic acid bacteria are usefully employed in making sauerkraut from fresh cabbage and silage from fresh grass. In most foods, however, the excessive growth of yeast, bacteria or molds indicates and accompanies spoilage.

In addition to microorganisms, raw organic foods contain certain substances called enzymes which appear to act somewhat as organic catalysts. A common example of such activity is demonstrated in the fruit ripening process. Even after the fruit is picked, enzyme activity continues and if not halted, eventually will cause the fruit to spoil and rot. Generally speaking, enzymes act upon foods in two ways, either to add to or reduce water content or take up oxygen. There are three generally recognized types of food enzyme activities, lipolytic, amylolytic and proteolytic, and each type produces marked effects which can contribute either to the spoilage or the preservation of foods. For instance, lipoxidase, which is a member of the lipolytic enzyme family, acts on fats and may cause butter, for example, to turn rancid. Cellulase and diastase, contrastingly assist in the preservation of foods by converting cellulose and starches into sugars, alcohol and esters, the latter giving the characteristic flavor to foods. Cellulase is especially effective in hydrolyzing cellulose, while diastase, being high in alpha amylase with some beta amylase, is particularly active on starches. The proteolytic enzyme family include, by way of example, papin, ficin, bromelin and others which generally act to hydrolyze and reduce proteins.

It is generally acknowledged that the processes and evolutions involved in food spoilage and deterioration are not fully understood, but it is known that the same are greatly accelerated by the presence of air, moisture and heat, particularly in excessive amounts. Since these factors are naturally present, it is extremely difficult to preserve and store foods without taking abnormal precautions to avoid these factors. For example, the surface exposure of foods to air greatly accelerates rancidification of fatty components, which action weakens the natural antioxidants present in foods and thereby helps to bring about complex adverse effects on enzyme splitting systems which are interlocked in the protein, carbohydrate and fatty food constituents. In this way, food becomes susceptible to destructive attack by bacteria, molds and yeasts.

One familiar instance, exemplifying the relationship of air, moisture and heat to the chemical and biological changes which may take place in raw food are the activities of oxygen, microorganisms, enzymes and related phenomena believed to occur in ensiled foods. It is generally believed that within the first 24 hours of storing a raw silage crop within a silo, the atmospheric oxygen is extremely active, causing high plant metabolism and a resulting release of high heat energy accompanied by increased plant enzyme and microorganism activity. Within the next 24-hour period, the oxygen demand appears usually to exceed the available oxygen supply so that plant metabolism is greatly reduced and/or halted altogether, while enzyme activity continues with the aerobe microorganism activity being negligible, but with anaerobe microorganism activity increasing. Atmospheric oxidation activity under these latter conditions appears to be negligible or non-existent, while enzymatic oxidation activity greatly increases. Within the next 24-hour interval, it is believed that atmospheric oxygen activity ceases altogether, along with plant metabolism, while the enzyme and anaerobe microorganism and bacteria activities sharply increase, accompanied by high enzyme oxidation activity.

While the foregoing is very generalized, it nevertheless serves to illustrate the complex and ever-changing nature of the biological and chemical reactions and resulting problems which attend storing food and amply points up the necessity of means for controlling and regulating such activities if successful food storage and preservation is to be achieved. Such control and regulation usually requires minimal atmospheric air and moisture concentrations which, in many circumstances, may be most difficult, if not impossible, to achieve.

Aside from the physical difficulties encountered in controlling air and moisture, the problem of storing food is further compounded by the reactions which occur within the food itself, as the same is transformed into a preserved state. In the case of an ensiled crop, for example, such reactions stem from plant respiration, the presence of enzymes within the plant cells, as well as the presence of bacteria, yeasts and molds in the raw ensiled plant material.

In brief, the present invention alleviates many of the difficulties and shortcomings heretofore experienced in food preservation, as above discussed, by providing improved combinations of selected ingredients which are added to food as a preserving means. The choice of such ingredients, according to this invention, is designed to regulate and control oxidation processes and accompanying chemical and biological changes which take place in such a manner as to preserve the food for prolonged periods, while maintaining desirable nutritional ingredients, appearance, color and general palatability values of the food. Fundamentally, the improved food preservative of this invention comprises predetermined combinations of selected antioxidants and enzymes which, when added to foods in predetermined quantities, bring about the desired regulated control of occurring oxidation and related chemical and biological activities. Thus, the present invention provides improved means for preventing food spoilage due to such factors as rancidification of fatty components, the molding of carbohydrates and the putrefaction of proteins. In addition, this invention produces noticeably improved results by way of retaining natural food coloring, taste, odor and general palatability over prolonged time periods.

The main object of this invention is to provide new and improved means for preserving food.

Another important object of this invention is to provide new and improved food preserving means comprising combined antioxidant and enzyme materials used as a food additive for preventing spoilage thereof.

An additional object of this invention is to provide new and improved food preserving means which are effective to avoid food spoilage over extended periods of time.

A still further object of this invention is to provide a new and improved food preserving means, as set forth in the preceding object, which, in addition to its marked ability to preserve food for extended periods, is also distinguished by its capability of preserving desired nutritional and palatable qualities therein.

Still another object of this invention is to provide a new and improved food preservative which, when applied to raw, stored food preserves the same over extended periods of time while maintaining desirable nutritional qualities therein without appreciable deterioration of the foods' natural color, odor and taste.

A still further important object of this invention is to provide a new and improved means for preserving food which is economical and simple to use and substantially eliminates food spoilage and waste.

Having thus described our invention, the best mode presently contemplated for carrying out its teachings and concepts shall now be set forth so as to enable those skilled in the art to which it pertains to make and use the same.

Because of their markedly higher moisture content, greater exposure to atmospheric oxygen and environmental temperature fluctuations, raw silage foods present one of the most difficult food categories to preserve without appreciable loss of available nutrients, flavor and general palatability, particularly over extended periods.

Previous to this invention, such silage foods were preserved, according to the best recognized principles and practices, either by carefully controlled harvesting, drying and storage procedures, directed principally toward the regulation and control of moisture and oxygen, or by adding to such natural or raw silage foods any of a variety of commercially available preservative materials. Such materials include, by way of example, sodium metabisulphite, zinc bacitracin antibiotic, various antioxidants, enzymes, mineral acids and some natural carbohydrates and starch materials, such as molasses and potato pulp.

Among such known and recognized preservative materials, the antioxidants have been considered most promising due to their recognized capacity to restrict oxidation and to retain natural carotenes and tocopherols present in forage crops. Among the more common antioxidant materials utilized for this purpose, chiefly because they are presently considered non-toxic and safe for use in foods, are butylated hydroxytoluene, butylated hydroxyanisole, propyl gallate, ethoxyquin, nordihydroguaiaretic acid, ascorbic acid and tocopherol. Such antioxidants are generally utilized either alone or with two or more thereof in combination. It is also common practice to utilize such antioxidant materials in combination with acids, such as citric acid, to increase and promote their general effectiveness.

Enzyme materials have also been resorted to because of their apparent ability to increase carbohydrate content resulting in the conversion of complex starches into simple, digestible sugars. The enzymes are also believed to use up available water or moisture so long as they remain active.

For the most part, however, such past practice of utilizing antioxidant preservatives or enzyme preservatives or others of the presently recommended and recognized preservative additives, as aforementioned, has not proven completely effective for preserving ensiled foods and preventing spoilage. For instance, when such known additive materials, according to present knowledge and practice, are applied to ensiled forage crops, even under ideal conditions of harvesting and storage, the same have not produced materially better results by way of preserving nutrients, color, flavor and general palatability than is obtainable by following recommended air and moisture control procedures without the benefit of such additives. Further, even in those instances where such additives or preservatives have resulted in apparently better preserving effects, such effects have not proven to be long-lasting so that the ultimate problem of spoilage and waste has not been successfully met and wholly avoided thereby.

Our present invention, whereby antioxidants are combined with enzymes, by way of contrast, is highly effective for preserving foods over extended periods. As a specific illustration of its merits and features, the same has proven particularly effective in preserving ensiled foods, including but not necessarily limited to such silage foods and crops as grass, legume, corn and sorghum, immature grains converted to wet silage foods, mature grains, hay and other like feed and food materials and mixtures as are normally prepared and stored by the farmer. This will appear from the teachings and observed results related hereinafter.

In practicing the present invention on ensiled foods and comparing the silage produced thereby with results obtained under comparative conditions according to the best previously known ensiling and preservation practices, the following occurred:

Silo I

An alfalfa hay crop was selected and an untreated portion thereof was ensiled in a first silo under the best known recommended procedures of air, moisture and storage control practice. After three weeks of ensiling, the silage had the following content assay:

SILAGE I

| Assay For— | As Is | Dry Wt. |
|---|---|---|
| Moisture, percent | 78.12 | |
| Ash, percent | 1.96 | 8.95 |
| Fat, percent | 0.62 | 2.83 |
| Protein, percent | 6.68 | 30.53 |
| Fibre, percent | 4.95 | 22.63 |
| Carbohydrate, percent | 7.67 | 35.05 |
| pH (acid) | 5.70 | |
| β carotene | 5.60 mg./lb | |
| Tocopherol | 1.00 mg./100 gms | |
| Odor | Acidic/Butyric | |
| Taste | Sour/Rancid | |
| Color | Dark | |

Silo II

A second portion of the same hay crop was also ensiled in a second silo and treated with a recognized commercially available antioxidant preservative formulated as follows:

Parts by weight
Butylated hydroxytoluene (BHT) _____ 3
Ethoxyquin _____ 3
Citric acid _____ 2

Such antioxidant preservative was added to the hay by dusting eight grams thereof over each ton of hay according to recommended and recognized procedure for its utilization. After three weeks of ensiling, the following content assay of the resulting silage was observed:

SILAGE II

| Assay For— | As Is | Dry Wt. |
|---|---|---|
| Moisture, percent | 76.76 | |
| Ash, percent | 2.11 | 9.07 |
| Fat, percent | 0.80 | 3.44 |
| Protein, percent | 6.87 | 29.56 |
| Fibre, percent | 5.18 | 22.28 |
| Carbohydrate, percent | 8.28 | 35.62 |
| pH (acid) | 5.20 | |
| β carotene | 8.80 mg./lb | |
| Tocopherol | 4.20 mg./100 gms | |
| Odor | Acidic/Butyric | |
| Taste | Sour/Rancid | |
| Color | Dark | |

*Silo III*

A third portion of the same hay crop was ensiled in a third silo utilizing a recognized commercial enzyme preservative added according to manufacturers' recommended practice and procedures. Such enzyme preservative was compounded as follows:

| | Parts by weight |
|---|---|
| Diastase | 6 |
| Cellulase | 1 |

This preservative was added to the hay by dusting the same thereover in the ratio of seven grams of enzyme preservative per ton of hay. After three weeks of ensiling, the resulting silage had the following content assay:

SILAGE III

| Assay For— | As Is | Dry Wt. |
|---|---|---|
| Moisture, percent | 74.90 | |
| Ash, percent | 2.07 | 8.24 |
| Fat, percent | 0.60 | 2.39 |
| Protein, percent | 7.31 | 29.12 |
| Fibre, percent | 6.04 | 24.02 |
| Carbohydrate, percent | 9.08 | 36.17 |
| pH (acid) | 5.65 | |
| β carotene | 7.30 mg./lb | |
| Tocopherol | 3.60 mg./100 gms | |
| Odor | Acidic/Butyric | |
| Taste | Sour/Rancid | |
| Color | Dark | |

*Silo IV*

A fourth portion of the same hay crop was treated according to the preservation practices of the present invention with a combined antioxidant and enzyme preservative having the following formulation:

| | Parts by weight |
|---|---|
| Diastase | 6 |
| Ethoxyquin | 3 |
| Butylated hydroxytoluene (BHT) | 3 |
| Citric acid | 2 |
| Cellulase | 1 |

This preservative was added to the hay by dusting substantially 15 grams thereof over each ton of hay which was then ensiled in a fourth silo. After three weeks of ensiling, the resulting silage had the following content assay:

SILAGE IV

| Assay For— | As Is | Dry Wt. |
|---|---|---|
| Moisture, percent | 69.10 | |
| Ash, percent | 2.90 | 7.30 |
| Fat, percent | 0.69 | 2.23 |
| Protein, percent | 8.85 | 28.64 |
| Fibre, percent | 3.80 | 12.29 |
| Carbohydrate, percent | 15.37 | 49.74 |
| pH (acid) | 4.50 | |
| β carotene | 13.00 mg./lb | |
| Tocopherol | 2.70 mg./100 gms | |
| Odor | Forage/Lactic | |
| Taste | Sweet/Forage/Lactic | |
| Color | Natural | |

In considering the above-indicated findings and observations, it will be noted that the preservative formulation, according to this invention and utilized in silage IV, is composed of the same ingredients and proportionate amounts thereof employed in the antioxidant preservative for silage II, in combination with the same ingredients and proportionate amounts thereof found in the enzyme preservative used in silage III. The resulting silages therefore afford a true comparison between the results obtained by using the antioxidant and enzyme preservative ingredients alone and the results obtained by their combined effect according to our present invention.

Comparing the above observed results, it will be readily recognized that silage IV, produced according to the present invention, is vastly superior and improved over any of the silages I–III, while silages II and III, utilizing antioxidant preservatives and enzyme preservatives, respectively are not particularly superior to silage I, produced by air and moisture control practices.

More specifically, silage IV desirably contains significantly less ash than any of the other three produced silages. The fat content of silage IV, while somewhat less than the lowest corresponding factor observed in silages I–III, is nevertheless compartive in all four silages. The protein value of all four silages is substantially equivalent, while the fibre content of silage IV is substantially less than the corresponding factor in any of the other three silages. This latter factor is most desirable since fibre is not particularly nutritional.

In comparing carbohydrate content of the four silages, it will be observed that the carbohydrate contents of each of the several silages I–III are substantially equal, but that such factor in silage IV, produced according to the present invention, is vastly increased thereover. By comparing the wet or "as is" percentages for the several silages, for example, it will be noted that silage IV has a carbohydrate content which is substantially 169% of the carbohydrate content for silage III, produced with the enzyme preservative and exhibiting the greatest carbohydrate percentage of any of silages I–III. As compared to silage I, produced under the best known procedures of air and moisture control, silage IV contains more than twice the carbohydrate content.

In considering the important beta carotene content of the several silages, it will be recognized that silage IV, produced in accordance with this invention, again exhibits vastly superior results in that factor. For example, the beta carotene content of silage IV is in excess of 200% of the corresponding factor in silage I; is some 146% of the beta carotene in silage II; and some 178% of the beta carotene in silage III.

It will also be observed that the tocopherol content in silage IV, while somewhat less than the corresponding factor in silos II and III, is nevertheless of comparative value thereto, while substantially exceeding the tocopherol content of the air and moisture control produced silage I.

Of further importance are the comparative pH values of the several produced silages. According to accepted authority, a pH value of between 4.0 and 5.0 is considered most desirable and important for complete preservation of silage. Therefore, the pH value of 4.5 produced in silage IV, according to this invention, is most significant and indicative of the achievement of the desired food preserving objective. By comparison with the other observed silages, the same demonstrates significant improvement over the indicated 5.7 pH value in the air and moisture controlled silage I, the 5.2 pH value for the antioxidant produced silage II and the 5.65 pH value for the enzyme treated silage III.

It is significant that of all four silages observed only silage IV exhibited a retention of desirable natural odor, taste and color factors after the three-week ensiling period.

While the foregoing exemplifies the working characteristics of this invention and establishes the same as productive of superior results when used for preserving ensiled foods, as compared to the best known procedures of air and moisture control, the use of antioxidant preservatives alone or the use of enzyme preservatives alone in silage production, experience has also shown that this invention is not restricted to that particular class of food preservation. Neither is the same restricted to the specific formulation of preservative ingredients set out hereinabove, although based on experience to date, it is believed that such indicated formulation of ingredients represents a preferred embodiment of this invention for general application. For instance, while the above-indicated preservative formula according to this invention specifies ethoxyquin and BHT antioxidants in equal proportionate amounts, such proportions, while preferred, may be varied, and the amounts of the antioxidants also successfully may be varied from about one gram to about one pound per ton of food. It has also been determined that other equivalent antioxidants may be substituted successfully for these particular ingredients, such as the antioxidants presently utilized in the food preserving art and listed heretofore.

In a like manner, the enzyme ingredients "diastase" and "cellulase" have been employed in amounts ranging from about 1/100 gram to 50 grams per ton of food and the specified proportions of such ingredients accordingly varied. Also, equivalent enzymes, of the amylolytic, lipolytic and proteolytic families, as previously mentioned, have been successfully substituted for the particular enzyme ingredients specified in our above preservative formula.

In order to determine the lasting quality of the improved preservative results obtained by the present invention, particularly in silage foods, each of the above specified exemplary silages I–IV was observed after six months of ensiling, with the following results:

Silages I–III, treated according to recommended air and moisture control procedures, the antioxidant preservative procedure and the enzyme preservative procedure, respectively, each developed foul, putrid, moldy and rancid odors, significant loss of color and definite sour and rancid tastes. However, after six months, silage IV, which was treated with the preservative according to our invention, showed no signs of mold or putrefaction or any significant loss of color or deterioration of taste from that observed at initial ensiling time. As a beneficial result of this improved durability of preservative effect, experience has shown that there is little or no feeding waste in silages preserved according to this invention.

To determine the effectiveness of the present invention to preserve and maintain fresh odors and tastes in dry foods, as opposed to wet foods previously discussed, one ton of hay was treated with a liquid composition of 15 grams of the improved preservative of our invention, formulated as above indicated, one lb. of dextrose and enough water to make one gallon of liquid. The one ton of hay was then tumbled with the one gallon of such liquid composition and a portion of the treated hay was then encased within an air-tight plastic bag. At the same time, an equal portion of untreated hay was likewise encased in another air-tight plastic covering and stored alongside the treated hay. After six months of storage, the plastic coverings were removed from the treated and untreated hay. It was observed that the hay treated with the preservatives according to our invention had retained its original fresh odor and taste without any indication of mold or other deterioration factors. Contrastingly, the untreated hay had developed a marked musty and stale odor and a moldy, rancid taste.

In still another practice of our invention, one ton of ground corn meal was tumbled with one gallon of the liquid composition of water, dextrose and our preservative, formulated as hereinabove set forth. The treated corn meal was then placed in a closed, air-tight plastic bag and stored. A corresponding amount of untreated corn meal was likewise placed and stored in another airtight plastic bag. At the end of six months, the two plastic bags were opened and the corn meals compared. The corn meal treated with the preservative of our invention had remained in a good state of preservation, with good fresh odor and taste, while the untreated corn meal had developed a definite stale odor and spoiled taste.

To establish the effectiveness of this invention under accelerated conditions of extreme moisture and heat, the following procedure was carried out:

Samples of the six-month old bagged hay and corn meal, treated with the preservative of this invention described immediately hereinabove, were diluted with an additional 50% amount of tap water and placed in separate open flasks. The samples were then incubated at 39° C. for a period of two months. After two months in such an atmosphere designed to rapidly accelerate spoilage due to extremely hot and humid climatic conditions, there were no observed indications of rancidity, mold or decay present in any of the samples.

From the foregoing, it is believed that those familiar with the art will readily recognize and appreciate the new and improved food preserving means of this invention which is effective over extended periods of time and which is demonstrative of marked improvements over previously known preservative means for this purpose. While the characteristics and features of the present invention have been described and related to particular observed results and related to an exemplary formula of ingredients, the same is nevertheless susceptible to wide variation, modification and substitution of equivalents without departing from the spirit and scope of this invention. It is intended therefore that the present invention be unlimited by the foregoing illustrative description thereof, except as may appear in the following appended claims.

We claim:

1. A food preservative comprising in combination, diastase, cellulase, ethoxyquin, butylated hydroxytoluene and citric acid; the antioxidants and enzymes respectively being combined substantially in the ratio of 1:1 by weight, and the enzymes being combined substantially in the ratio of 6:1 by weight, diastase to cellulase.

2. A food preservative comprising non-toxic antioxidants and enzymes combined in substantially equal proportionate amounts by weight of antioxidants and enzymes; the antioxidants comprising ethoxyquin and butylated hydroxytoluene and the enzymes comprising a major proportion of diastase and a minor proportion of cellulase.

3. A food preservative comprising in combination:

| | Parts by weight |
|---|---|
| Diastase | 6 |
| Ethoxyquin | 3 |
| Butylated hydroxytoluene | 3 |
| Citric acid | 2 |
| Cellulase | 1 |

4. In a food preservative, the combination comprising 3 parts by weight ethoxyquin, 3 parts by weight butylated hydroxytoluene and 7 parts by weight diastase and cellulase, there being a substantially greater proportion by weight of diastase.

5. In a food preservative, the combination comprising 3 parts by weight ethoxyquin, 3 parts by weight butylated hydroxytoluene, 6 parts by weight diastase, and 1 part by weight cellulase.

6. In a food preservative, the combination comprising 3 parts by weight ethoxyquin, 3 parts by weight butylated hydroxytoluene, 2 parts by weight citric acid, and substantially 6 parts by weight diastase and 1 part by weight cellulase.

7. In a food preservative, the combination comprising 3 parts by weight ethoxyquin, 3 parts by weight butylated hydroxytoluene, 2 parts by weight citric acid, and 7 parts by weight enzymes consisting of diastase and cellulase.

8. In a food preservative, the combination comprising equal parts by weight of each ethoxyquin and butylated hydroxytoluene antioxidants, and enzymes consisting of cellulase diastase in amounts substantially equal by weight to the combined amounts of said antioxidants.

9. A preserved ensiled food comprising ensiled food, 3 parts by weight of each of the antioxidants ethoxyquin and butylated hydroxytoluene; 2 parts by weight citric acid, 6 parts by weight of the enzyme diastase, and 1 part by weight of the enzyme cellulase; the amounts of said enzymes being from about $1/100$ gram to about 50 grams per ton of ensiled food and the amounts of said antioxidants being from about 1 gram to about 1 pound per ton of ensiled food.

10. A liquid composition for use in preserving dry foods comprising, per gallon of liquid, substantially 15 grams of a dry preservative compound comprising 3 parts by weight of each ethoxyquin and butylated hydroxytoluene, 2 parts by weight citric acid, 6 parts by weight diastase and 1 part by weight cellulase; 1 pound of dextrose, and the remainder water.

References Cited by the Examiner
UNITED STATES PATENTS

| | | | |
|---|---|---|---|
| Re. 23,523 | 7/1952 | Baker | 99—150 |
| 2,935,449 | 5/1960 | Bavley. | |
| 2,988,449 | 6/1961 | Hollenbeck. | |
| 3,006,815 | 10/1961 | Scott. | |
| 3,051,572 | 8/1962 | Tribble | 99—2 |
| 3,063,912 | 11/1962 | Otaka | 195—63 |
| 3,141,775 | 7/1964 | Surgant | 99—9 |
| 3,170,794 | 2/1965 | Geffreys et al. | 99—9 |
| 3,232,832 | 2/1966 | Ono | 195—62 |
| 3,249,442 | 5/1966 | Keyes et al. | 99—2 |
| 3,250,622 | 5/1966 | Brooks. | |

A. LOUIS MONACELL, *Primary Examiner.*

D. J. DONOVAN, *Assistant Examiner.*